(12) United States Patent
Horie et al.

(10) Patent No.: US 7,954,823 B2
(45) Date of Patent: Jun. 7, 2011

(54) SEALING RING FOR RECIPROCATING MOTION

(75) Inventors: Satoshi Horie, Aso (JP); Masashi Nakao, Aso (JP)

(73) Assignee: NOK Corporation, Tokyo (JP)

( * ) Notice: Subject to any disclaimer, the term of this patent is extended or adjusted under 35 U.S.C. 154(b) by 374 days.

(21) Appl. No.: 12/223,667

(22) PCT Filed: Feb. 2, 2007

(86) PCT No.: PCT/JP2007/051761
§ 371 (c)(1),
(2), (4) Date: Aug. 6, 2008

(87) PCT Pub. No.: WO2007/097175
PCT Pub. Date: Aug. 30, 2007

(65) Prior Publication Data
US 2009/0166979 A1  Jul. 2, 2009

(30) Foreign Application Priority Data

Feb. 21, 2006 (JP) ................... 2006-043975
May 22, 2006 (JP) ................... 2006-141418

(51) Int. Cl.
*F16J 9/20* (2006.01)
*F16J 15/18* (2006.01)
*F16J 15/32* (2006.01)

(52) U.S. Cl. ......... 277/436; 277/529; 277/566; 277/644

(58) Field of Classification Search ............. 277/436, 277/438–439, 448, 529, 540, 566, 582, 589, 277/626, 644
See application file for complete search history.

(56) References Cited

U.S. PATENT DOCUMENTS

| 3,336,033 A | * | 8/1967 | Baldwin | 277/449 |
| 3,366,392 A | * | 1/1968 | Kennel | 277/448 |
| 3,926,444 A | * | 12/1975 | Gripe et al. | 277/448 |
| 5,261,677 A | * | 11/1993 | Gotoh et al. | 277/438 |
| 5,297,805 A | * | 3/1994 | Merkin et al. | 277/322 |

FOREIGN PATENT DOCUMENTS

| JP | H2-58164 | 4/1990 |
| JP | H2-87174 | 7/1990 |
| JP | H4-84863 | 7/1992 |

* cited by examiner

*Primary Examiner* — Vishal Patel
(74) *Attorney, Agent, or Firm* — Jacobson Holman PLLC

(57) ABSTRACT

A sealing ring used for reciprocating motion and having low friction characteristics. The sealing ring is held at one of two members that move relative to each other and slidably in intimate contact with the other. The sealing ring has an end sliding part having an arcuate cross section and slidably in intimate contact with the other and also has a recessed surface formed in at least either a rear face or both side faces in an axial direction. The sealing ring satisfies the relationships of $A/2 < R < 13A^2$ and $0.5A < C < A$, where R is the radius of curvature of the end sliding part, A is the axial width of the sealing ring, and C is the thickness of the sealing ring between the deepest parts of the recessed surfaces.

1 Claim, 7 Drawing Sheets

Cross Sectional Shape of D-Ring

Friction Waveform (Three-Dimensional) Relating Between Average Friction Coefficient fc and Lubricating Characteristic Number G

SEALING RING FOR RECIPROCATING MOTION

This is a national stage of the International Application No. PCT/JP2007/051761 filed Feb. 2, 2007 and published in Japanese language.

BACKGROUND OF THE INVENTION

1. Field of the Invention

The present invention relates to a sealing ring in accordance with a sealing technique, and more particularly to a sealing ring which is suitable for being used for a reciprocating seal. The sealing ring in accordance with the present invention is used, for example, in a field of a motor vehicle, an industrial machine or the like.

2. Description of the Conventional Art

In the field of a motor vehicle, an industrial machine or the like, a squeeze packing such as an O-ring, a D-ring or the like is frequently used as a sealing ring for a reciprocating motion, however, since there is less occurrence of torsion than that of an O-ring and there is an advantage in cost, a D-ring having a D-shaped cross section is frequently used (refer to Japanese Unexamined Utility Model Publication No. 04-84863).

However, in any case, in the light of a resource saving and an energy saving, a low friction is required with regard to a sliding characteristic of the sealing ring for a reciprocating motion.

SUMMARY OF THE INVENTION

Problem to be Solved by the Invention

The present invention is made by taking the point mentioned above into consideration, and a technical object of the present invention is to provide a sealing ring for a reciprocating motion, which can achieve a low friction with regard to a sliding characteristic, has a high durability and can contribute to a resource saving and an energy saving.

Means for Solving the Problem

In order to achieve the object mentioned above, in accordance with the present invention, there is provided a sealing ring held to one member in two relatively moving members and slidably brought into close contact with the other member, a sliding portion with the other member being formed in a circular arc cross sectional shape, wherein the sealing ring is formed in such a shape as to satisfy the following expression, and have a concave surface in at least one of both side surfaces facing in an axial direction and a back surface at an opposite side to the sliding portion $$A/2 < R < 13A^2 \qquad (1)$$

in which a symbol R denotes a radius of curvature of the sliding portion, and a symbol A denotes a width in an axial direction of the sealing ring.

The sealing ring in accordance with the present invention provided with the structure mentioned above is worked out as a result of the following earnest study by the inventors of the present invention.

In the sealing ring such as an O-ring, a D-ring, a rubber packing or the like used for a reciprocating seal in a motor vehicle and an industrial machine, there is a demand of a low friction in the light of the resource saving and the energy saving. Accordingly, in order to achieve the low friction, the inventors have made a study of a friction characteristic (Stribeck curve) of a D-ring.

An experiment has been carried out by utilizing a hydraulic servo vibration testing machine 1 shown in FIG. 1. In particular, a sliding portion is constituted by a fixed inner tube 3 connected to a frictional force measuring load cell 2, and a cylinder 4 reciprocating in a sine wave mode up and down. As shown in FIG. 2 enlargedly, a D-ring 21 is installed to an installation groove 3a of the fixed inner tube 3, and a compression (compressing amount) of the D-ring 21 is set with the aim of 0.37 mm by the cylinder 4 (a collapsing rate is between 8 and 30% in general). A lubricating oil 5 is filled in one side of the D-ring 21. In FIGS. 1 and 2, reference numeral 6 denotes a cross head, reference numeral 7 denotes support columns, reference numeral 8 denotes a constant temperature bath, reference numeral 9 denotes a shaft (an upper side), reference numerals 10 and 11 denote flanges, reference numeral 12 denotes a shaft (a lower side), reference numeral 13 denotes a cylinder, and reference numeral 14 denotes a vibration exciter.

The experiment has been carried out by fixing a stroke to 6 mm under a temperature of 40° C. and changing a frequency in a range between 0.05 and 2.5 Hz.

Three kinds of oils have been used for the lubricating oil. Natures thereof are shown in Table 1.

TABLE 1

| | Lubricating oil | | |
| --- | --- | --- | --- |
| | Dynamic viscosity (mm²/s) | | Density |
| Kind | 40° C. | 100° C. | 15° C. |
| A | 34.12 | 5.55 | 0.873 |
| B | 325.1 | 24.55 | 0.901 |
| C | 3900 | 120.0 | 0.949 |

A measuring procedure of the friction is as follows. First, a break-in period running is carried out in thirty reciprocations (stroke is 6 mm and frequency is 0.17 Hz), the ring is left for three minutes, and a data acquisition is thereafter executed at a time when frictional force becomes stable at a predetermined frequency.

Hereinafter, a stroke in which the D-ring makes a movement toward the lubricating oil side is called as a pumping stroke, and a reverse thereto is called as a motoring stroke. Further, a lubricating characteristic number G affecting the friction characteristic and an average friction coefficient fc at the middle of the stroke are defined as follows.

$$G = \eta(S\pi v)/(Pr/L) \qquad (2)$$

$$fc = Fc/Pr \qquad (3)$$

η: lubricating oil viscosity (Pa·s),
S: stroke (m)
v: frequency (Hz)
L: shaft peripheral length (m)
Pr: tension force (N)
Fc: friction force at the middle of stroke (N)

The D-rings having five shapes shown in FIG. 3 are used as the D-ring for the reciprocating motion. An inner diameter Φ of the D-ring is set to 50 mm in all the shapes. A material of the D-rings is ACM rubber material, and physical properties thereof are shown in Table 2.

TABLE 2

| Material of D-ring | |
|---|---|
| Item | Physical properties |
| Hardness (IRHD) | 70 |
| Tensile strength (MPa) | 11.8 |
| Ultimate elongation (%) | 190 |
| Specific gravity | 1.31 |

FIG. 4 shows typical friction waveforms in each of the lubricating characteristic numbers. FIG. 5 shows a relation between the average friction coefficient fc at the middle of the stroke and the lubricating characteristic number G.

The average friction coefficient fc is reduced in a region having a small value of G ($G<10^{-6}$) and is increased in a region having a large value of G ($G>10^{-4}$), with respect to an increase of the lubricating characteristic number G, and indicates a minimum value in the region of $10^{-6}<G<10^{-4}$. The value G indicating the minimum value is called as a critical lubricating characteristic number, which is indicated by Gc, and is roughly shown as follows with respect to each of the seal shapes.

shape a (R=0.3 mm): $Gc=3.0\times10^{-5}$
shape b (R=0.5 mm): $Gc=1.9\times10^{-5}$
shape c (R=0.7 mm): $Gc=6.9\times10^{-6}$
shape d (R=1.0 mm): $Gc=5.7\times10^{-6}$
shape e (R=2.0 mm): $Gc=3.9\times10^{-6}$ In other words, the value Gc is reduced together with an increase of a radius of curvature R of an outer end of the D ring corresponding to a contact portion.

In the region of G>Gc, a relation $Fc \propto G^{1/2}$ is recognized. Further, the friction waveform shows a maximum value at the middle portion of the stroke (refer to FIG. 4). These features indicate a fact that fluid lubrication is dominant in this region. Even in the region in which the fluid lubrication is dominant, the average friction coefficient fc depends on the radius of curvature R at the outer end of the D-ring corresponding to the contact portion, and the average friction coefficient fc tends to be reduced by an influence of a fluid wedge effect in accordance with the increase of the radius R. However, the reducing rate is not significant. It is considered that this occurs because an increase of the film thickness reduces the influence of the radius of curvature R.

On the other hand, in the region of G<Gc, it is considered that the contact is made directly on the contact surface. However, the average friction coefficient fc in the region of $G<1.0\times10^{-5}$ indicates a tendency that it becomes smaller in accordance with the increase of the radius of curvature R at the outer end of the D-ring corresponding to the contact portion. It is considered that this occurs because the fluid wedge effect is significantly applied together with the increase of the radius of curvature R at the outer end of the D-ring, even if a temporal and spatial contact exists.

In other words, it is possible to make the oil film formation easy by enlarging the radius of curvature R at the outer end of the D-ring, and it is possible to lower the average friction coefficient in all the region of G.

Since "shape d" in FIG. 3 is the conventionally known D-ring shape (R=A/2), it is known that the average friction coefficient fc becomes smaller in the case that the radius of curvature R is made larger than "shape d" such as "shape e" in FIG. 3 (FIG. 5).

In this case, the upper limit value of the radius of curvature R is set to $R<13A^2$ because the shape comes to such a shape as to be boundlessly close to a so-called square ring having a rectangular cross sectional shape if the radius of curvature R becomes entirely larger, and "fluid wedge effect" is not applied if the radius of curvature R exceeds the upper limit thereof, whereby it does not function as the reciprocating seal. Accordingly, such the limit value is set.

In the sealing ring of "shape e" in which the radius of curvature R is enlarged in comparison with the conventional known D-ring such as "shape d" in FIG. 3, it is possible to lower the friction coefficient as is apparent from the result of experiment mentioned above. However, a cross sectional area (volume) becomes larger at the slidable portion side in accordance with the increase of the radius of curvature R. Therefore, the tension force with respect to the opponent sliding surface is slightly increased. Further, the following expression (4) is obtained from the expression (3) mentioned above.

$$Fc=fc \cdot Pr \quad (4)$$

Even if the friction coefficient fc is lowered, the reduction of the friction force Fc is suppressed by the increase of the tension force Pr.

Then, the present invention succeeds in reducing the tension force Pr and sufficiently lowering the friction force Fc, by lowering the friction coefficient as the result of defining the radius of curvature R of the sliding portion at the outer end and the width A in the axial direction of the sealing ring in such a manner as to satisfy the relation of the expression (1) mentioned above, and by forming the concave surface in at least one of both side surfaces facing in the axial direction and a back surface at an opposite side to the outer end sliding portion. In particular, in the case that the concave surfaces are formed in both the side surfaces facing in the axial direction, a rigidity of a middle portion in a radial direction is lowered, and in the case that the concave surface is formed in the back surface, a rigidity of the back surface side backed up by one member holding the sealing ring is lowered, whereby surface pressure (tension force) of the outer end sliding portion to the sliding surface of the other member is lowered.

Further, in the case that the concave surfaces are formed in both the side surfaces facing in the axial direction, it is preferable to set a thickness C in the axial direction between the deepest portions to satisfy the following expression (5).

$$0.5A<C<A \quad (5)$$

In particular, the relation 0.5A<C is defined in the expression (5) mentioned above, because if the thickness in the axial direction between the deepest portions becomes equal to or less than 0.5A by the concave surfaces in both the side surfaces facing in the axial direction, the rigidity with respect to the radial direction becomes too low at the middle portion in the radial direction where the thickness is smallest, so that a buckling tends to occurs. Further, in the case that the concave surface is formed in both the side surfaces facing in the axial direction, the relation C<A is satisfied as a matter of course.

Effect of the Invention

In accordance with the sealing ring for the reciprocating motion on the basis of the present invention, it is possible to reduce the friction force caused by the reciprocating sliding motion in the axial direction by reducing the tension force as well as lowering the friction coefficient, and thereby it is also possible to improve a durability.

DETAILED DESCRIPTION OF PREFERRED EMBODIMENT

Figure 6:
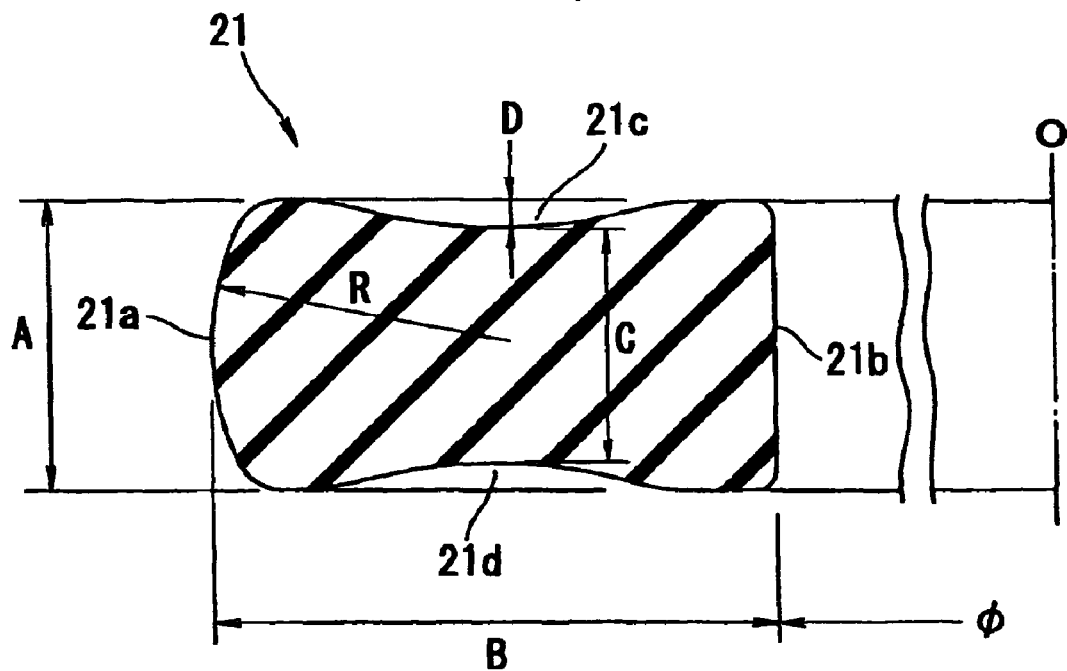
FIG. 6 is a half cross sectional view obtained by cutting a first embodiment of a sealing ring for a reciprocating motion in accordance with the present invention by a plane passing through an axis.

FIG. 6 is a cross sectional view showing a first embodiment of a sealing ring for a reciprocating motion in accordance with the present invention by cutting it with a plane passing through an axis O. A sealing ring 21 is formed in an annular shape by using an ACM rubber material as a molding material, an outer end sliding portion 21a at an outer peripheral side has that a cross section formed in a circular arc shape convexed at an outer periphery, a back surface 21b at an opposite side thereto (an inner peripheral side) is formed in a cylindrical surface shape, and gentle concave surfaces 21c and 21d which are symmetrical with each other are formed in both side surfaces facing in an axial direction.

As an example of a specific dimension, an inner diameter Φ of the sealing ring 21 is 50 mm, a width A in an axial direction is 2.0 mm, a width B in a radial direction is 3.8 mm, and a radius of curvature R of the outer end sliding portion 21a is set to 2.0 mm which is the same as the width A in the axial direction, and is within the range of the expression (1) mentioned above. Further, a radius of curvature of the concave surfaces 21c and 21d is larger than the radius of curvature R of the outer end sliding portion 21a, and a depth D of a middle intermediate portion in the radial direction (the deepest portion) at the concave surfaces 21c and 21d comes to 0.16 to 0.17 mm.

In accordance with the cross sectional shape as mentioned above, since formation of an oil film becomes easy because the radius of curvature R of the outer end sliding portion 21a is large, as described above, a friction coefficient is lowered. Further, since a thickness of the middle portion in the radial direction is reduced by the concave surfaces 21c and 21d in both the side surfaces facing in the axial direction, and thereby rigidity thereof is lowered, surface pressure of the outer end sliding portion 21a is lowered, and friction force caused by the reciprocating sliding motion in the axial direction can be reduced.

Figure 7:
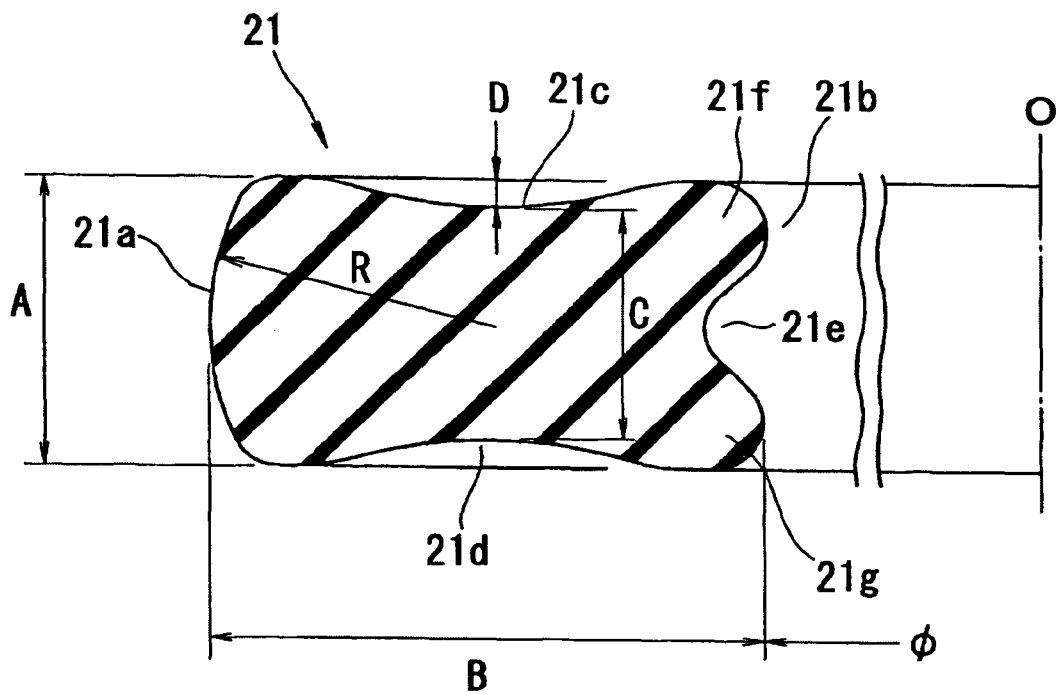
FIG. 7 is a half cross sectional view obtained by cutting a second embodiment of the sealing ring for a reciprocating motion in accordance with the present invention by a plane passing through the axis.

Next, FIG. 7 is a cross sectional view showing a second embodiment of the sealing ring for a reciprocating motion in accordance with the present invention by cutting it with a plane passing through the axis O. The sealing ring 21 has a concave surface 21e formed at an middle portion in an axial direction of the back surface 21b, in addition to the structure of the first embodiment shown in FIG. 6 described previously. In other words, the sealing ring 21 is formed in such a shape as to have a pair of lips 21f and 21g made by the concave surface 21e at a back surface side. As a specific dimension, a depth of the concave surface 21e is about 0.39 mm, and radii of curvature of the concave surface 21e and the lips 21f and 21g are respectively set to about 0.33 mm. Further, the inner diameter Φ, the width A in the axial direction, the width B in the radial direction, the radius of curvature R of the sliding portion 21a, the radii of curvature of the concave surfaces 21c and 21d, the depth D of the deepest portion and the like are the same as those of the first embodiment.

In accordance with the cross sectional shape mentioned above, since the rigidity of the back surface side backed up by a member (an inner surface of a groove) (not shown) holding the sealing ring 21 is lowered, it is possible to further reduce the friction force caused by the reciprocating sliding motion in the axial direction of the outer end sliding portion 21a together with the effect obtained by the first embodiment. Further, even in the structure in which both the side surfaces facing in the axial direction are formed in a flat surface shape, and the concave surface 21e is formed only at the back surface portion, it is possible to sufficiently reduce the friction force on the basis of the reduction of the rigidity of the back surface side.

In the sealing ring 21 in accordance with the first embodiment (FIG. 6) or the second embodiment (FIG. 7) mentioned above, since the width A in the axial direction is 2.0 mm, and the depth D of the deepest portions of the concave surfaces 21c and 21d in both sides facing in the axial direction is 0.16 to 0.17 mm, the thickness C in the axial direction of the sealing ring 21 at the deepest portions of the concave surfaces 21c and 21d comes to about 1.66 to 1.68 and satisfies the expression (2) described previously. Therefore, it is possible to prevent the sealing ring 21 from buckling with respect to the radial direction. Particularly, in the case that the sealing ring 21 is made of the ACM rubber material in which a hardness of a durometer A is 70 degree, it is preferable that the thickness C in the axial direction is set to 0.8 A<C<0.85 A as in the first embodiment or the second embodiment.

Figure 1:
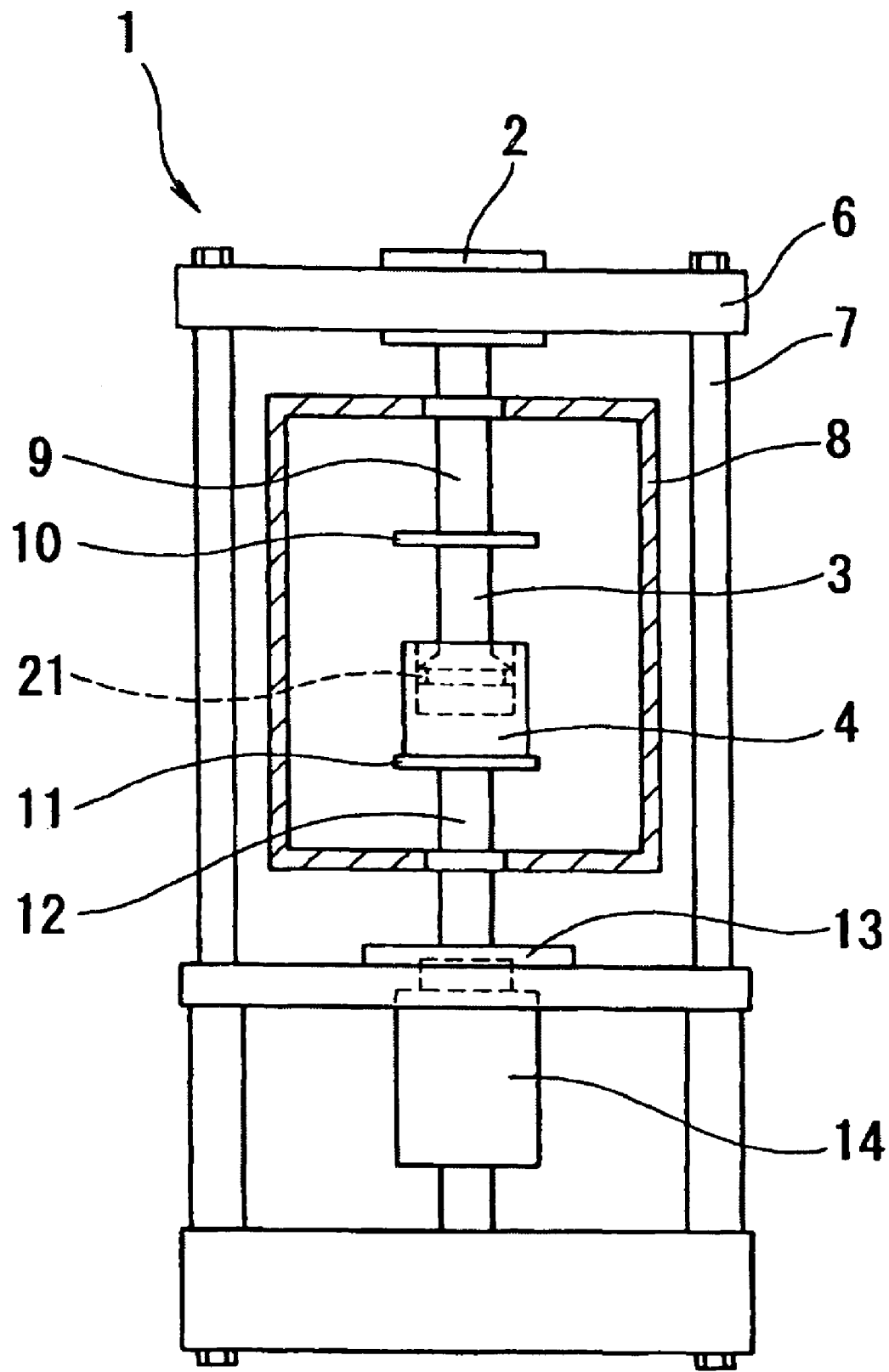
FIG. 1 is an explanatory view of a hydraulic servo vibration testing machine used for an A experiment.
Figure 2:
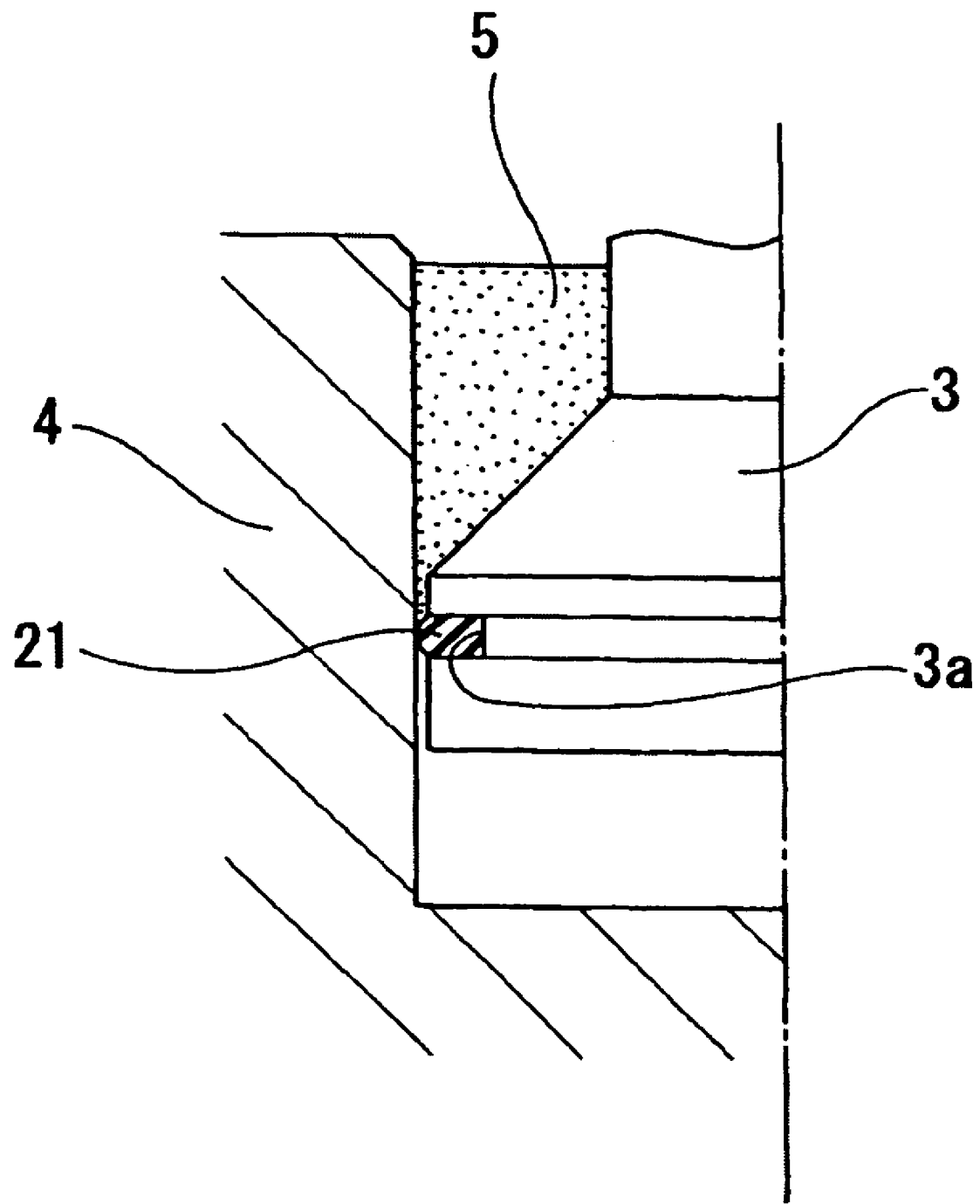
FIG. 2 is an enlarged cross sectional view of a main portion of the testing machine.
Figure 3:
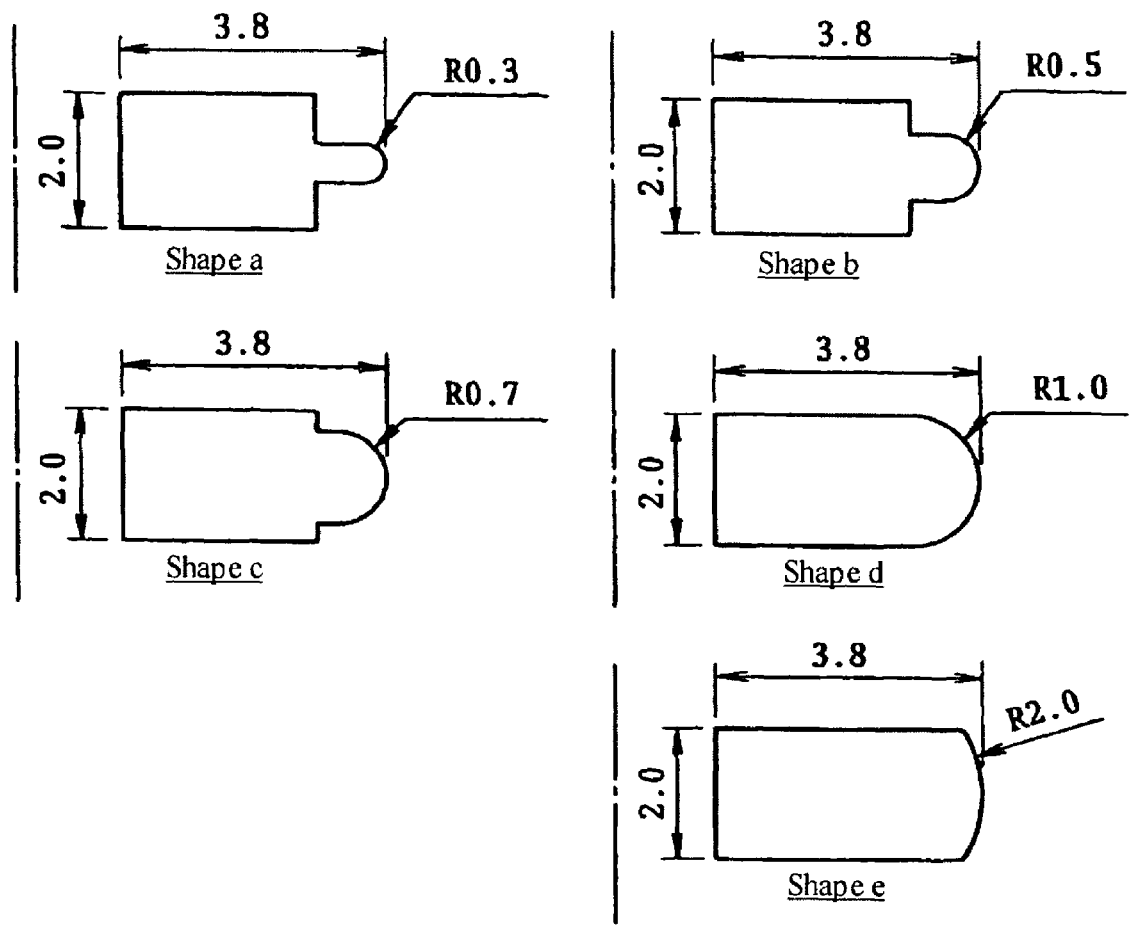
FIG. 3 is an explanatory view showing a test sample used for the experiment.
Figure 4:
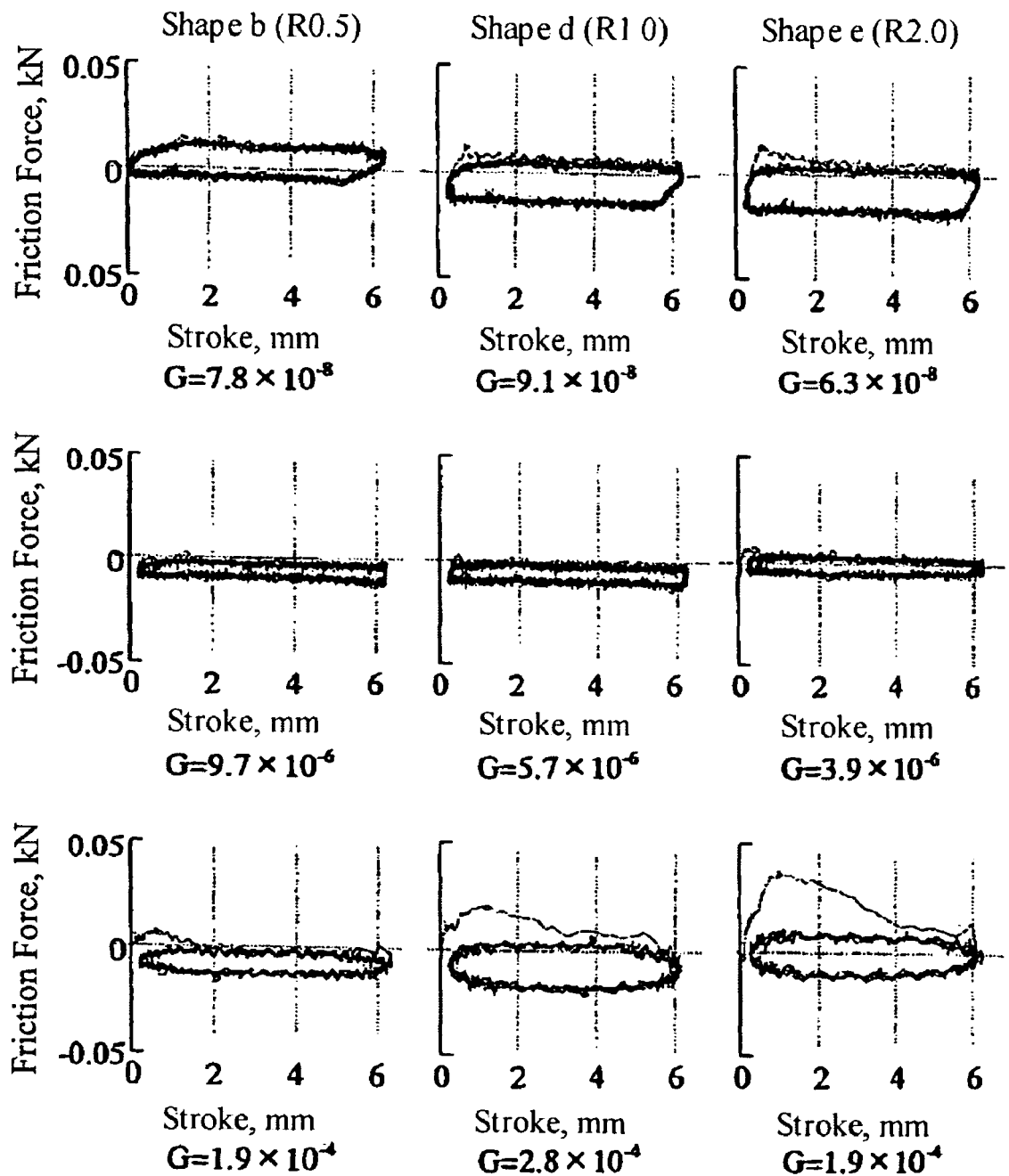
FIG. 4 is an explanatory view showing a friction waveform in the experiment.
Figure 5:
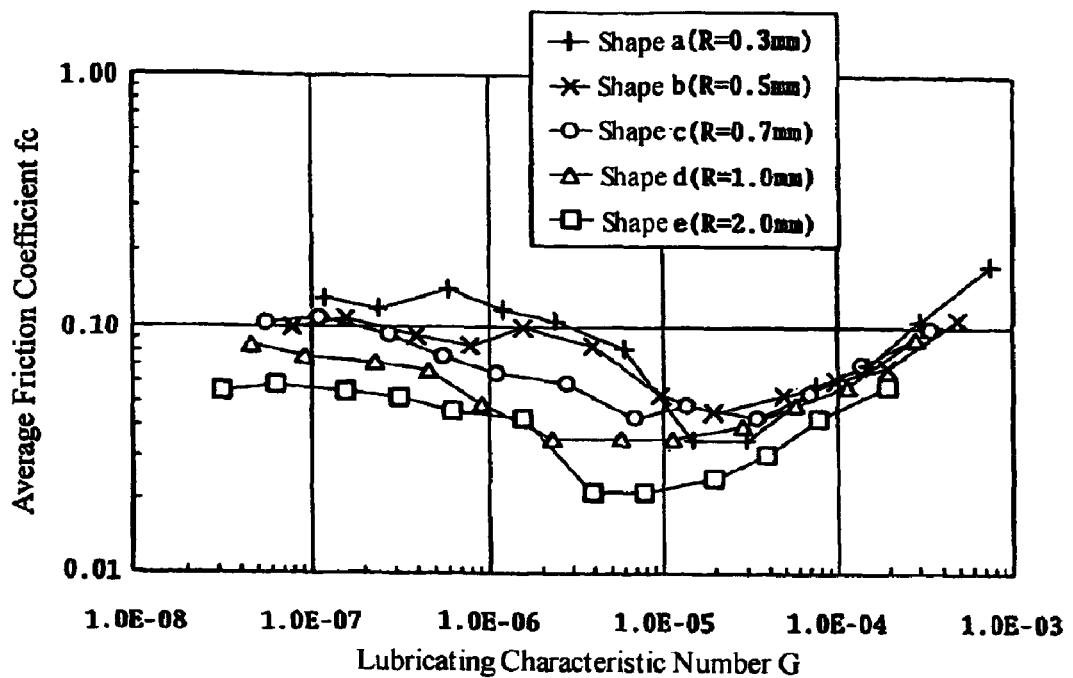
FIG. 5 is an explanatory view showing a relation between an average friction coefficient and a lubricating characteristic number in the experiment.
Figure 8:
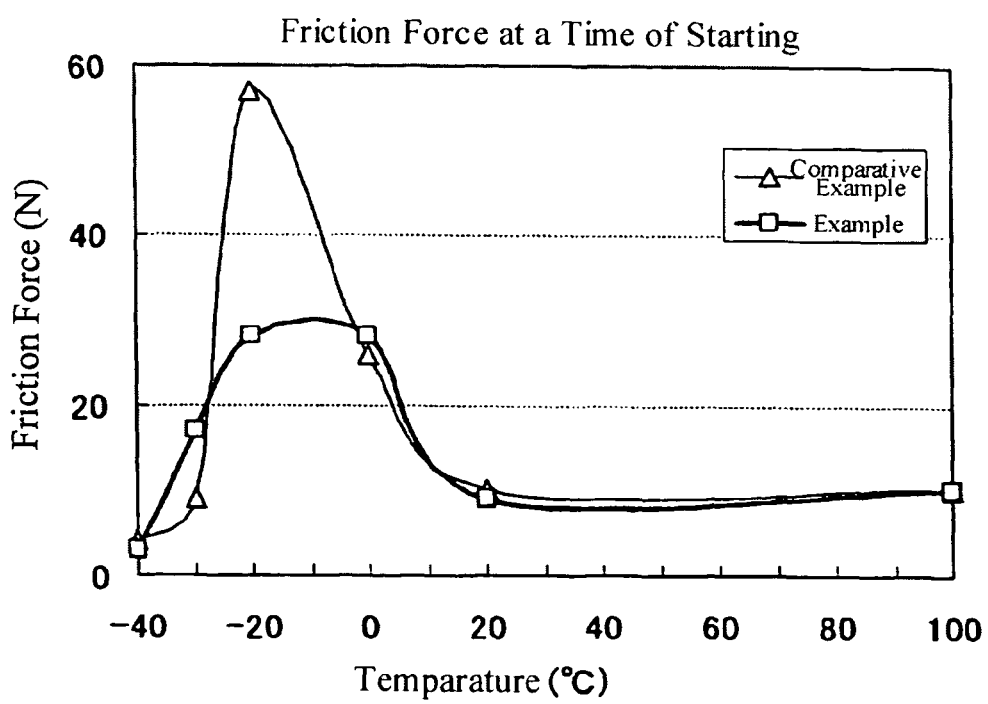
FIG. 8 is a graph showing a result obtained by measuring friction force at a time of starting.
Figure 9:
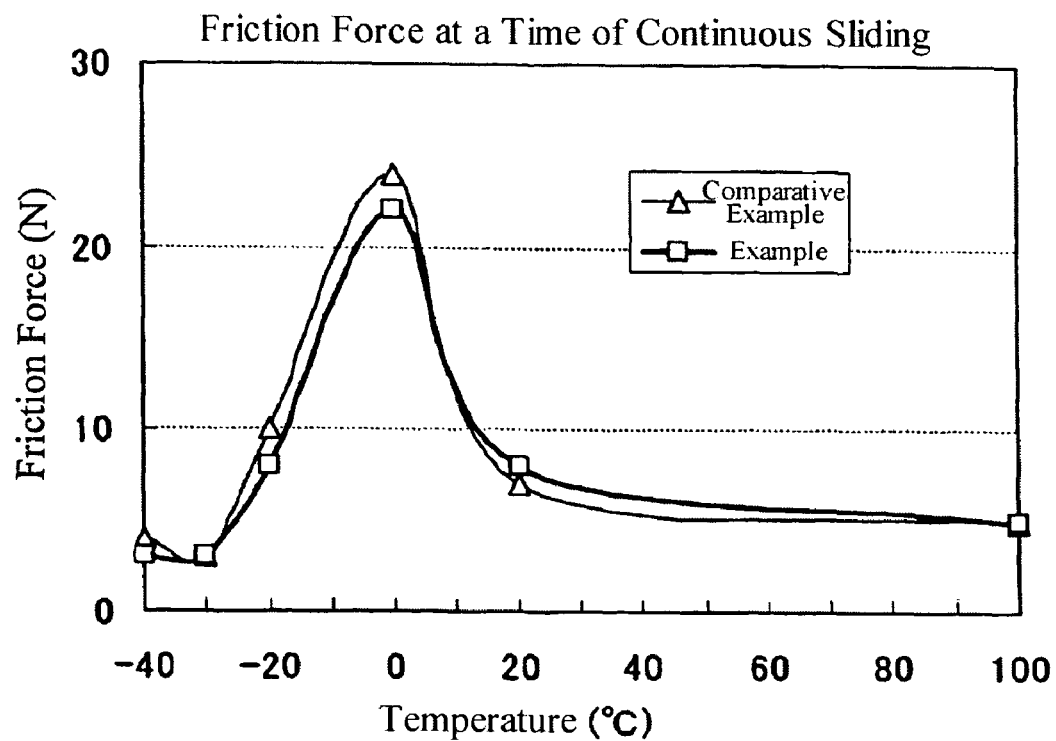
FIG. 9 is a graph showing a result obtained by measuring friction force at a time of sliding.

FIG. 8 is a graph showing a result obtained by carrying out a sliding test under the condition of stroke length: 6 mm, sliding speed: 2 mm/sec and pressure: 0 MPa while using the sealing ring 21 in the second embodiment shown in FIG. 7 for an example and using a D-ring (R=1.0 mm) having "shape d" in FIG. 3 for a comparative example, and measuring the friction force of the outer end sliding portion 21a at a time of starting in accordance with different temperature conditions, and FIG. 9 is a graph showing a result obtained by measuring the friction force at a time of the reciprocating sliding motion in accordance with the different temperature conditions.

On the basis of the results of the test, it is confirmed that the friction force under the low temperature of the sealing ring in accordance with the example becomes small, particularly the reduction of the friction force is significant under the low temperature, at a time of starting.

Figure 10:
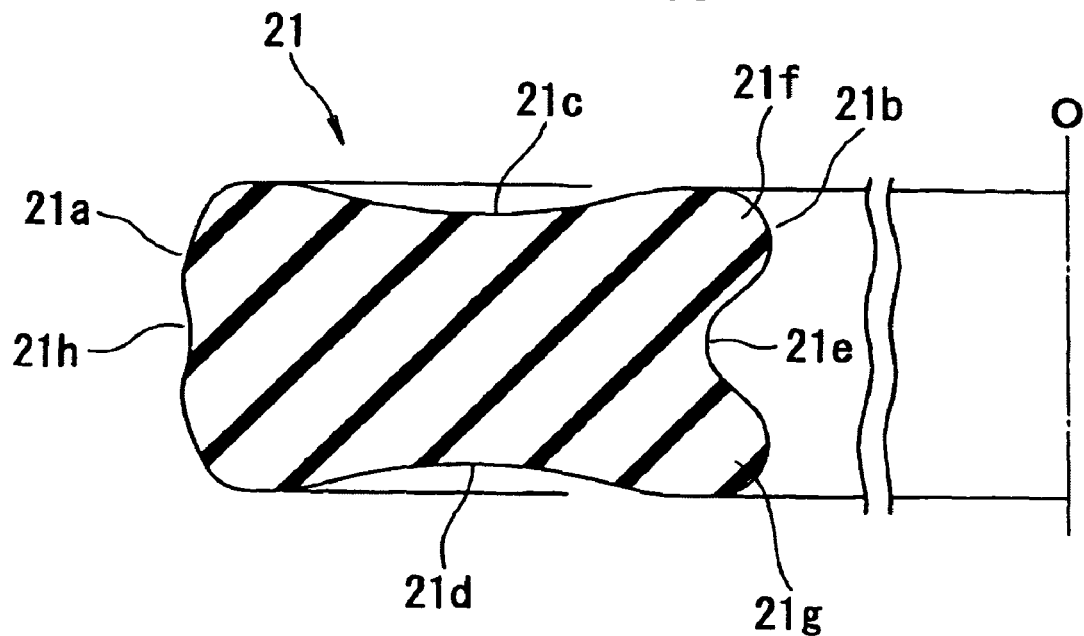
FIG. 10 is a half cross sectional view obtained by cutting a third embodiment of the sealing ring for a reciprocating motion in accordance with the present invention by a plane passing through the axis.

Next, FIG. 10 is a cross sectional view showing a third embodiment of the sealing ring for a reciprocating motion in accordance with the present invention by cutting it with a plane passing through the axis O. In particular, the sealing ring 21 is structured such that a shallower concave surface 21h than the concave surface 21e at the back surface side is formed at the middle portion in the axial direction of the outer end sliding portion 21a, in addition to the structure of the second embodiment shown in FIG. 7 described previously.

In accordance with this structure, since the concave surface 21*h* formed at the outer end sliding portion 21*a* serves as an oil reservoir holding a lubricating oil such as grease or the like, it is easy to form an oil film on the outer end sliding portion 21*a*. Accordingly, it is possible to make friction force smaller.

INDUSTRIAL APPLICABILITY

The sealing ring for a reciprocating motion in accordance with the present invention can be utilized as the reciprocating seal of a motor vehicle or a industrial machine, whereby low friction can be achieved.

The invention claimed is:

1. A sealing ring for a reciprocating motion, the sealing ring being held to one member in two relatively moving members and slidably brought into close contact with the other member, and a sliding portion with said other member being formed in a circular arc cross sectional shape, the sealing ring comprising
a shape having a concave surface in both side surfaces facing in an axial direction, said concave surface in said both side surfaces being symmetrical with each other, and a back surface at an opposite side to said sliding portion, said back surface including a central concave portion in the axial direction of said back surface, said central concave portion defining a pair of lips, each of the lips being located on an opposite side of said central concave portion, the sliding portion including a central concave portion in the axial direction for holding a lubricating oil, said central concave portion of the sliding portion being shallower than the central concave portion of the back surface, the shape of the sealing ring satisfying the expression $A/2 < R < 13A^2$ where R denotes a radius of curvature of said sliding portion and A denotes a width in an axial direction of said sealing ring, and
a thickness C of the shape in the axial direction between deepest portions of the concave surfaces of both of the side surfaces in the axial direction is set to $0.5A < C < A$.

* * * * *